United States Patent [19]

Miller et al.

[11] Patent Number: 4,603,640
[45] Date of Patent: Aug. 5, 1986

[54] DEVICE FOR INCREMENTALLY IDENTIFYING THE VEHICLE POSITION OF A MAGNET LEVITATION VEHICLE

[75] Inventors: Luitpold Miller, Ottobrunn; Helmut Knöll, Erligheim; Juergen Meins, Wolfenbuettel, all of Fed. Rep. of Germany

[73] Assignee: Thyssen Industrie AG, Fed. Rep. of Germany

[21] Appl. No.: 738,887

[22] Filed: May 28, 1985

Related U.S. Application Data

[63] Continuation of Ser. No. 464,911, Feb. 8, 1983, abandoned.

[30] Foreign Application Priority Data

Feb. 10, 1982 [DE] Fed. Rep. of Germany ....... 3204615
Mar. 30, 1982 [DE] Fed. Rep. of Germany ....... 3211628

[51] Int. Cl.⁴ .............................................. B60L 13/06
[52] U.S. Cl. .................................... 104/282; 104/284; 104/293; 246/122 R; 340/933
[58] Field of Search ............................ 246/122 R, 249; 104/281, 282, 284, 287, 288, 290, 292–294; 310/13; 318/135; 340/47, 933, 941, 942

[56] References Cited

U.S. PATENT DOCUMENTS 3,281,779 10/1966 Yeiser ............................. 246/249 X
3,324,301 6/1967 Goldberg ....................... 340/942 X
3,377,616 4/1968 Auer, Jr. ..................... 246/122 R X
3,526,886 9/1970 Lubich ............................. 246/122 R
3,644,825 2/1972 Davis, Jr. et al. ............. 340/941 X
3,804,024 4/1974 Gottzein et al. ................. 104/290 X
3,865,043 2/1975 Schwärzler ..................... 340/941 X

FOREIGN PATENT DOCUMENTS 2116724 10/1972 Fed. Rep. of Germany .
2610752 9/1977 Fed. Rep. of Germany ... 246/122 R
2803877 8/1979 Fed. Rep. of Germany .

Primary Examiner—Robert B. Reeves
Assistant Examiner—Edward M. Wacyra
Attorney, Agent, or Firm—Hill, Van Santen, Steadman & Simpson

[57] ABSTRACT

The incremental detection of the vehicle position of a magnetic levitation vehicle, particularly having an elongate stator motor, can occur with at least one coded measuring strip which extends in the direction of travel with a fixed positional assignment to the stator winding and can occur with a sensor system disposed on the vehicle. The sensor system comprises a plurality of sensors disposed at a distance in the direction of travel for detecting the coding. For reliably identifying the relative and the absolute vehicle position given high resolution of the measured signals, the measuring strip, in addition to a pole position coding, also exhibits a slot coding for determining the vehicle location and the sensors arranged independently of the drive system comprise measuring windings for the pole position decoding and measuring windings for the slot decoding. The measuring windings for the pole position decoding are disposed at a different angle relative to the measuring strip than are the measuring windings for the slot decoding.

23 Claims, 21 Drawing Figures

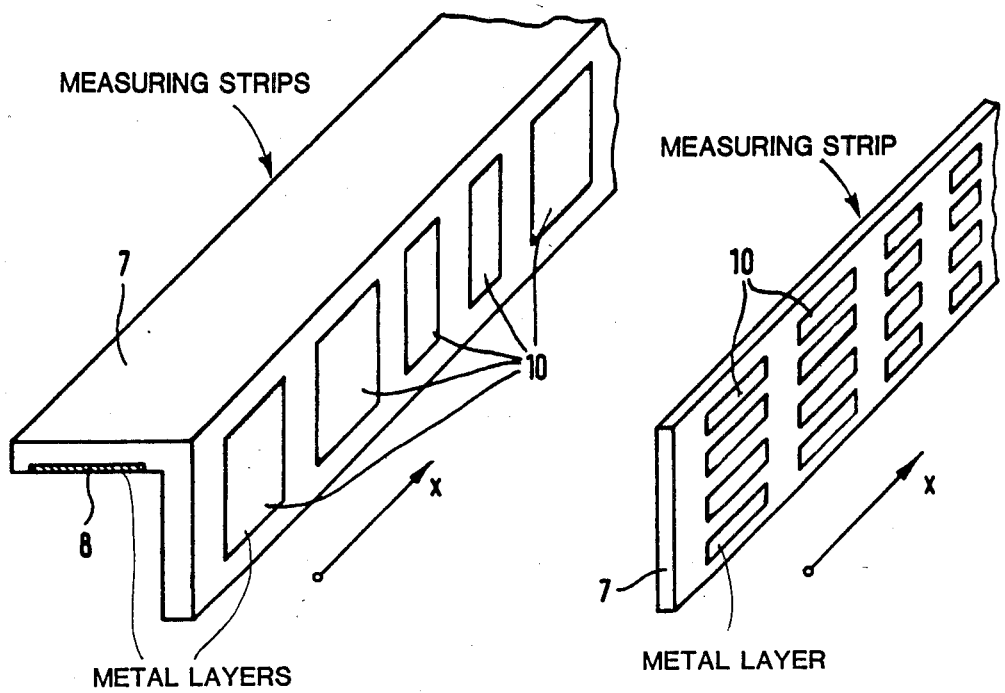

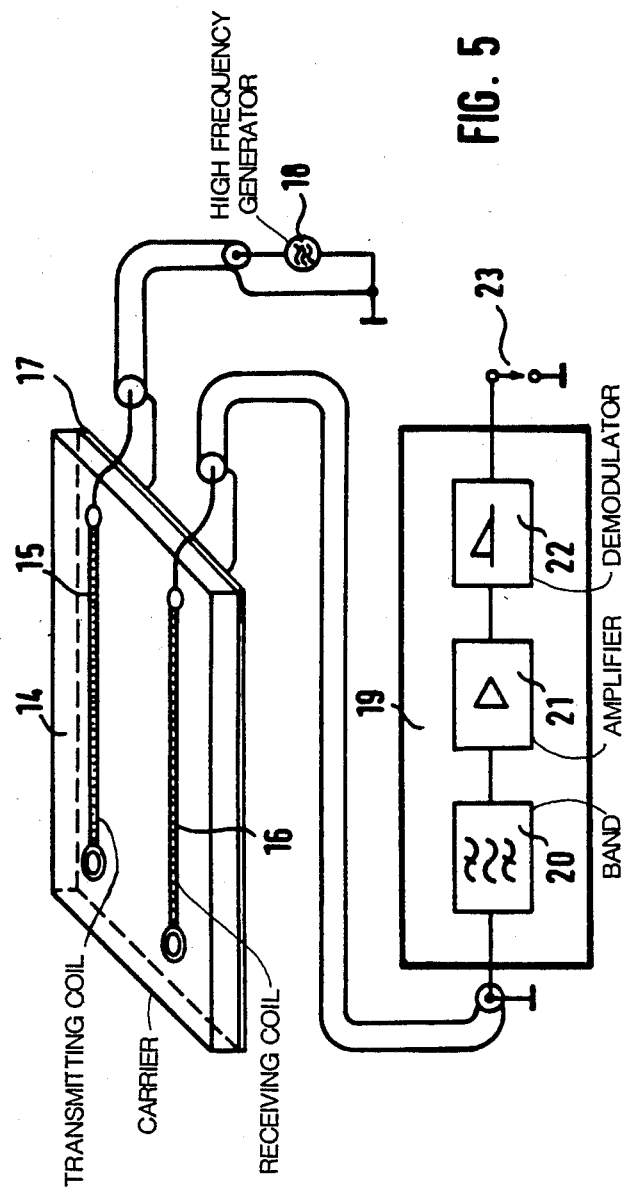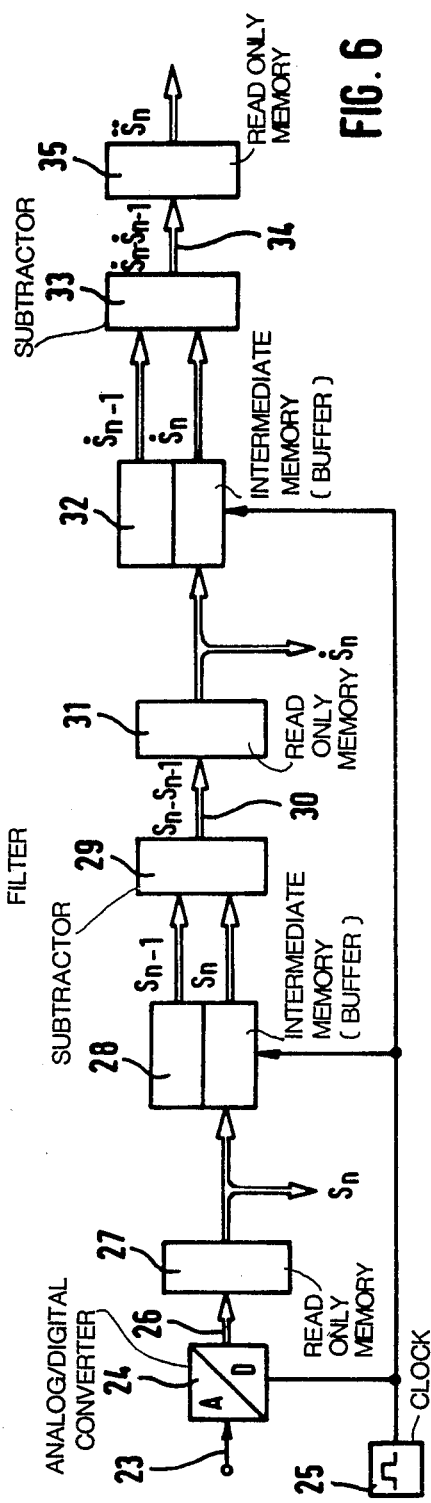

$$\underline{U}_{pm} = \hat{U}\left[\cos\theta_m + j\sin\theta_m\right] = \hat{U}e^{j\theta_m}$$

$$\underline{U}_{pR} = \left[\cos\theta_R - j\sin\theta_R\right] = e^{-j\theta_R} \quad (Gl.1)$$

$$\underline{U}_{pm} \cdot \underline{U}_{pR} = \hat{U} e^{j(\theta_m - \theta_R)}$$

$$= \hat{U}\left[\cos(\theta_m - \theta_R) + j\sin(\theta_m - \theta_R)\right]$$

$$= U_d + jU_q$$

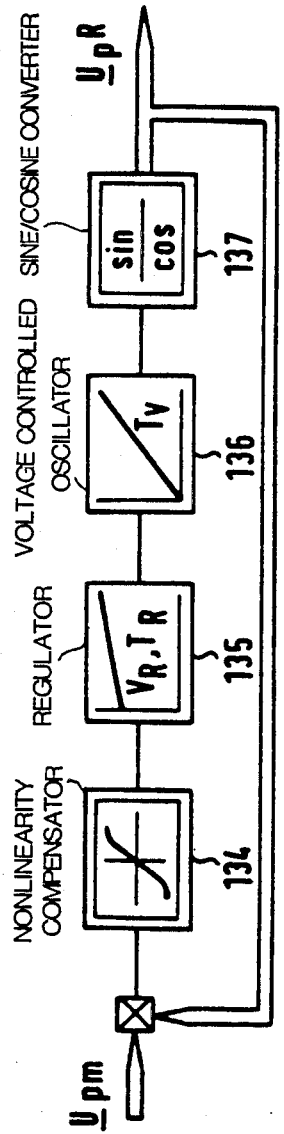
FIG. 16
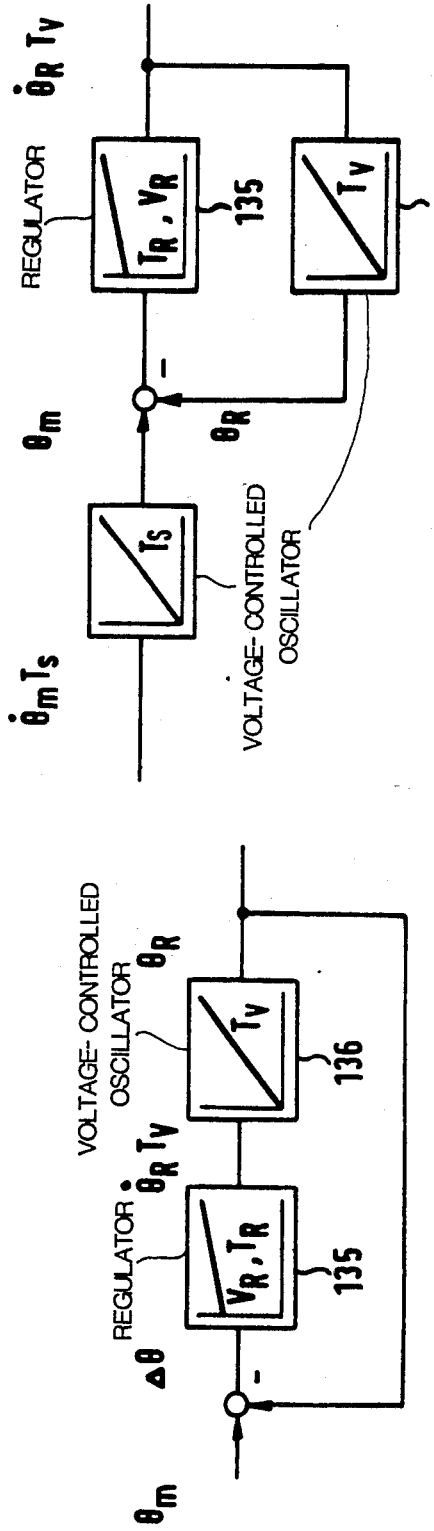
FIG. 17
FIG. 18
$$v_R = \frac{\tau_p}{\pi} \dot{\theta}_R$$

DEVICE FOR INCREMENTALLY IDENTIFYING THE VEHICLE POSITION OF A MAGNET LEVITATION VEHICLE

This is a continuation of application Ser. No. 464,911 filed Feb. 8, 1983, now abandoned.

BACKGROUND OF THE INVENTION

1. Field of the Invention

The present invention relates to a device for incrementally identifying the position of a magnetic levitation vehicle, particularly having a long stator motor, comprising at least one coded measuring strip which extends in the direction of travel with a fixed positional allocation relative to the stator winding, and comprising a sensor system disposed on the vehicle and comprising one or more sensors arranged with a spacing in the direction of travel for detecting the coding.

2. Description of the Prior Art

In order to stabilize the propulsive forces in a synchronous elongate stator motor, it is necessary to acquire information concerning the relative position of the vehicle-related excitation field and the stator winding distribution in order to be able to define the phase relation of the thrust-creating stator ampere turns per centimeter. Beyond this, information is also required concerning the absolute vehicle position as well as the vehicle velocity. It is therefore necessary to control the mechanical air gap between the portative magnet and the rail.

It is known in the art, given a synchronous linear motor having path-controlled excitation, to dispose a coded measuring strip along the stator, this lying in the area of sensors whose measuring signals supply reference values for the excitation current (in this connection see the German published application No. 21 16 724). The sensors are disposed in the area of the exciting winding so that the measured signals are influenced by the induction currents.

An inductive measuring system is known in the art for measuring and controlling the mechanical air gap between the magnet and the support rail, the measuring system being disposed directly between the magnet and the rail, as in the German published application No. 28 03 877. This measuring system is likewise influenced by the magnets.

The continuous identification of absolute vehicle position, i.e. the location of the vehicle along the rail, has heretofore occurred by way of integrating the path information. Despite reliable integration methods, however, such a position identification leaves much to be desired because errors cannot be excluded or, respectively, because the positional information must be reliably stored.

SUMMARY OF THE INVENTION

The object of the present invention is to provide a new and improved device of the type mentioned above in such a manner that the relative and the absolute vehicle position can be identified with a high accuracy and largely uninfluenced by the fields of the drive system.

The above object is achieved in that, in addition to a pole position coding, the measuring strip also comprises a slot coding for identifying the absolute vehicle position and in that the sensors disposed independently of the drive system comprise measuring windings for the pole position decoding, on the one hand, and measuring windings for the slot decoding, on the other hand, whereby the axes of the measuring windings for the pole position decoding are disposed at a different angle relative to the measuring strip than are the axes of the measuring windings for the slot decoding.

The measuring strip is disposed, according to the present invention, such that it is substantially free of fields of the drive system. The sensitivity of the sensors assigned to the measuring strip accordingly increases. As a result, it, in turn, becomes possible to employ sensors which comprise measuring windings for the pole position decodings, on the one hand, and measuring windings for the slot decoding, on the other hand, which, therefore, can decouple fields which are established for the purpose of measuring in the area of the measuring strip and which are influenced by the coding of the measuring strip.

In particular, the sensors can be constructed as U-shaped or E-shaped cores whose legs are directed towards the measuring strip, whereby the measuring windings for the pole position decoding are disposed at the legs and the measuring windings for the slot decoding are disposed at a traverse orientation. The high degree of decoupling of the desired measuring information can therefore already be achieved by way of the geometrical disposition of the individual measuring windings.

The measured signals, moreover, are sufficiently large so that disturbances can be virtually eliminated by way of forming the difference of the measured signals of two adjacent measuring windings. Accordingly, two neighboring traverses should carry a measuring winding for the slot decoding.

Independently thereof, it is advantageous when two sensor systems are provided, these being offset relative to one another in the direction of travel and being disposed with different spacings relative to the measuring strip. The different spacing of the sensors from the measuring strip again enables a differential formation by way of which the influences of the spacing of the sensors from the measuring strip can be eliminated by way of a differential formation.

The two sensor systems which are offset relative to one another in the direction of travel, being particularly offset relative to one another by half a pole position of the stator winding, also enable the identification of a so-called pole position vector which identifies the position of the vehicle relative to the stator winding.

A very simply constructed, coded measuring strip can be interrogated with such sensors. The pole position coding advantageously comprises rectangular recesses on the measuring strip disposed at the spacing of the pole division of the stator winding. The measuring windings for the pole position decoding then register the changes of a magnetic field built up on the other side of the measuring strip given passage of the recesses or, respectively, of the tongues located therebetween, essentially registering these as a first harmonic oscillation whose frequency corresponds to the pole division of the stator winding.

In contrast thereto, the slot coding can comprise broad slots which are disposed at the tongues remaining between the recesses. Although the pole position decoding is somewhat disrupted due to this slot decoding because the magnetic field built up at the other side of the measuring strip is also influenced by the slots, the disruptions can be governed in a simple manner when the number of slots on each tongue is constant.

It is also advantageous when the slots are disposed flush right or flush left relative to a constant distancing grid because the disruption of the pole position information is at a minimum given the constant distancing grid and, moreover because unambiguous information can be obtained by way of disposing the slots right or left of the grid boundaries.

Whereas the measured signals which contain the pole position information are analog signals having a high resolution, the measuring windings for the slot decoding supply digital measured signals which can be processed in a conventional manner for determining the absolute vehicle position.

For the purpose of processing the measured signals containing the pole position information, a phase control circuit for the formation of a pole position vector can be assigned to the measuring windings for the pole position decoding. The phase control circuit advantageously comprises a regulator and an oscillator controlled by the output of the regulator and followed by a sine/cosine converter. A signal which corresponds to the traveling speed arises at the output of the regulator.

Further advantageous developments are set forth below which, in particular, describe an embodiment wherein the measuring strips comprise an angular cross section whereby the vertical leg of the measuring strip carries the pole position coding and the slot coding, whereas the horizontal leg of the measuring strip forms a reference plane, which reference plane lies outside of the portative magnet for identifying the mechanical air gap between the portative magnet and the rail.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1a is a schematic illustration taken along a section I—I of FIG. 1;

FIG. 3 is a perspective illustration of a section of a measuring strip;

FIG. 4 is a perspective illustration of a section of a different measuring strip;

FIG. 5 is a combination perspective and schematic illustration of a measuring installation for identifying the mechanical air gap between the portative magnet and the rail;

FIG. 6 is a schematic block diagram of a circuit for evaluating the measured signals obtained with the measuring installation of FIG. 5;

FIG. 16 is a schematic block diagram of a phase control loop for identifying the pole position vector;

FIG. 17 is a schematic block diagram of a linearized phase control loop for identifying the pole position angle; and FIG. 18 is a block diagram for determining the vehicle velocity.

DESCRIPTION OF THE PREFERRED EMBODIMENTS

Figure 1:
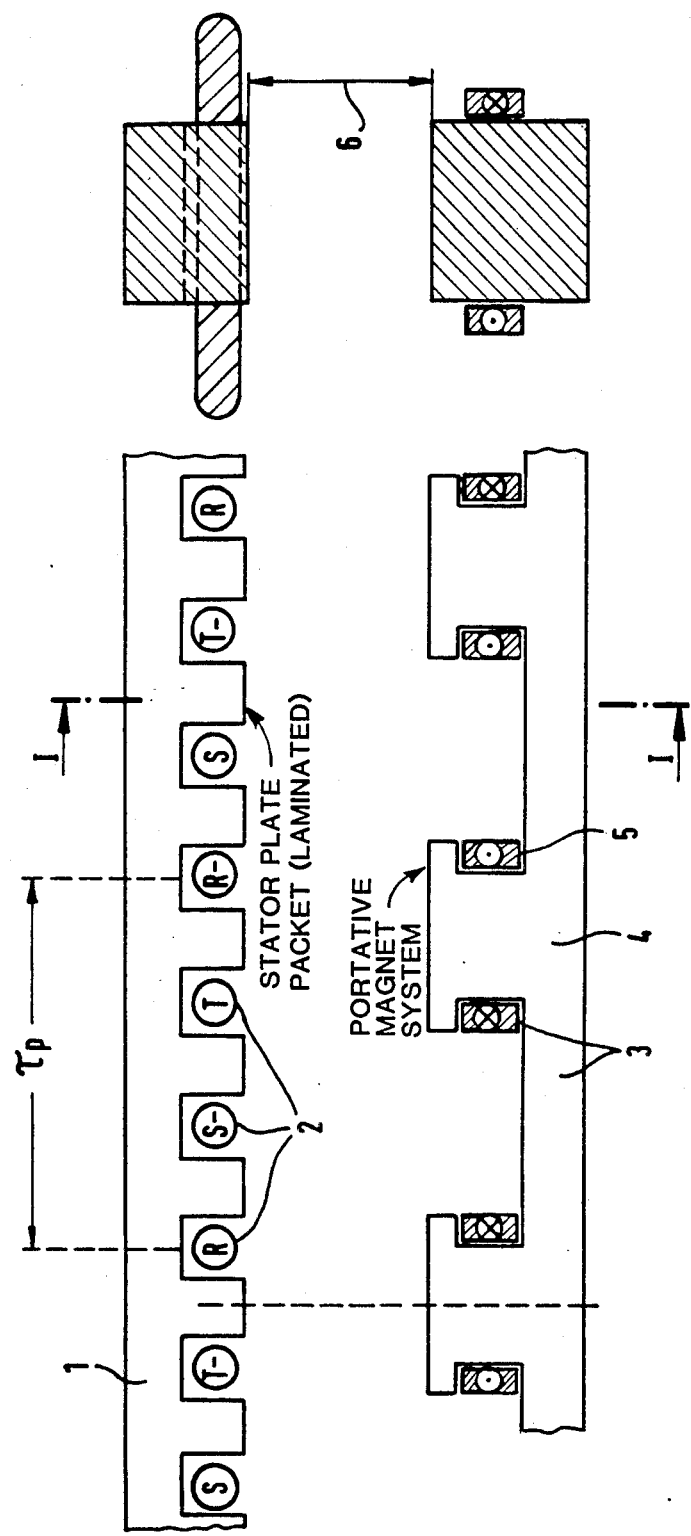
FIG. 1 is a schematic representation of a section of a stator plate packet for a synchronous elongate stator motor of a magnetic levitation vehicle together with a section of a portative magnet connected to the vehicle.

First explained on the basis of FIGS. 1–10 is how the absolute and relative vehicle position information desired for the operation of the vehicle can be obtained, in particular with a measuring strip without slot decoding, from the signals of the pole position decoding and from the signals of the gap measurement.

An embodiment wherein the measuring strip additionally exhibits a slot coding is then explained with reference to FIGS. 11–18.

Given a magnetic levitation track comprising a synchronous elongate stator motor (FIG. 1), the stator plate packet 1 is stationarily connected to the travel path. A 30 current winding 2 is inserted in grooves of the stator plate packet 1, the 30 current winding being fed by the drive inverter of the substructure with 30 current having variable amplitude and frequency, whereby a traveling ampere bar wave is formed in a known manner along the stator. In order to minimize the reactive power and voltage requirement of the motor, respectively only one sub-piece of the stator winding 2 is activated with so-called section switches which are actuated as a function of the position of the vehicle relative to the travel path. The exciting field of the elongate stator synchronous motor is generated by the portative magnets 3 connected to the vehicle, the portative magnets 3 comprising a magnetic core 4 and an excitation winding 5. In addition to the function of magnetic support, the portative magnets therefore simultaneously offer the excitation field for the synchronous machine.

It is necessary for developing the desired propulsive force that the propagation speed of the induction wave and, therefore, the vehicle velocity as well occurs synchronous with the propagation speed of the ampere bar wave. With prescribed amplitudes of the two first harmonic oscillation traveling waves, the maximum propulsive force occurs when the optimum relative position of the vehicle-related exciting field relative to the stator winding distribution is observed (this would correspond to the observation of the optimum field spider angle given a synchronous 30 motor).

This can be achieved by way of a suitable frequency control of the drive inverter in the substructure, whereby the momentary vehicle velocity and the relative position of the excitation system 3 relative to, for example, phase R of the stator winding 2 must be present as measured variables for the control of the drive inverter in the substructure or substation.

Furthermore, a vehicle locating system should also be able to recognize the switch positions as well as the potential changes of the phase sequence of the stator winding 2.

In order to control the levitation spacing 6 (FIG. 1a) to a prescribed value, this as well as its first and second derivative with respect to time, is required. Due to the slotting of the stator plate packet and its laminations, the content-free acquisition of these values is extraordinarily difficult and has not yet been satisfactorily achieved.

The Measured Variables

Levitation spacing and its first and second derivations with respect to time, and Vehicle position with the values to be derived therefrom relate to 1. The position of the excitation system relative to the elongate stator winding,
2. The direction of travel,
3. The vehicle velocity,
4. The vehicle location,
5. The positional identification of the section switches,
6. The switch location, and
7. The phase sequence of the elongate stator winding.

The levitation, support or suspension and drive control of magnetic levitation vehicles having an elongate stator motor have been respectively identified with separate devices in installations heretofore known.

The same also applies to short stator vehicles wherein, however, the values to be derived of the items 1, 5 and 7 above, are eliminated.

The above devices tailored to the respective measuring job produce great complexity for the overall system and are therefore unsatisfactory in technical and economic terms. The present invention attempts to alleviate this condition.

To this end, a measuring strip, according to the present invention, is applied along the stator plate packet, the measuring strip being fixed in positive lock with an invariable spacing relative to the tooth surface of the stator plate packet and exhibiting a fixed assignment relative to the elongate stator winding in the propagation direction of the ampere bar wave. The defined position of the measuring strip is advantageously and accurately and unambiguously achieved by way of additional grooves introduced into the stator plate packet and/or by way of corresponding mounts on the fastening parts of the stator winding, having uniform mounting parts and without additional adjustment means.

Figure 2:
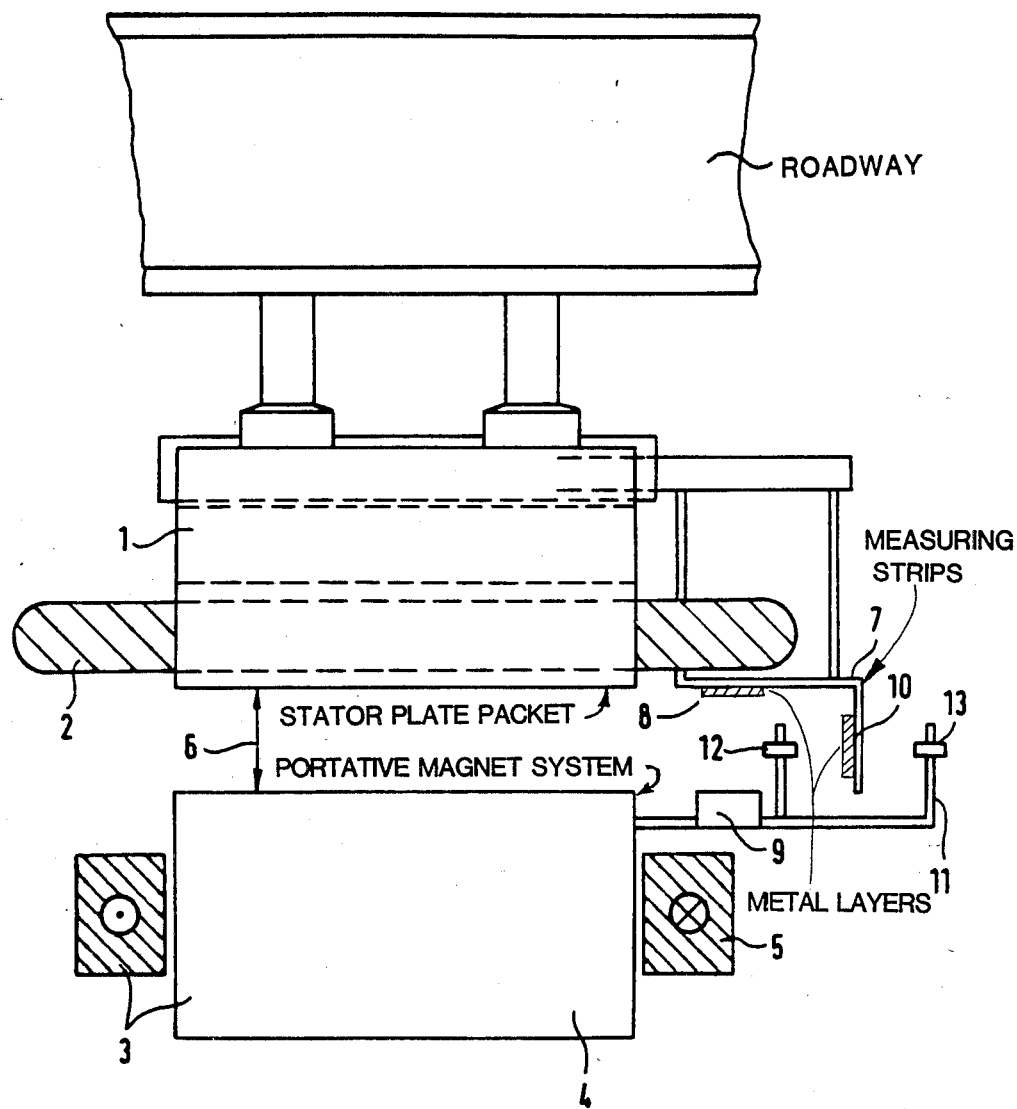
FIG. 2 is a schematic representation of a vertical section (corresponding to the projection of FIG. 1a) through the travel path and the magnetic levitation vehicle.

FIG. 2 illustrates an exemplary embodiment having the angular measuring strip 7 secured to the stator plate packet 1 wherein a continuous metal coating 8 is applied parallel to the slot surface of the stator plate packet and in the propagation direction of the ampere bar wave. The metal coating 8 serves as a measuring surface for identifying the levitation gap 6 by way of a sensor 9 which is mounted in a defined position relative to the pole surface of the magnetic core 4. Problems occurring given measurement of the levitation gap 6 relative to the slotted stator plate packet are therefore avoided. Furthermore, the gap signal measured by the sensor 9 relative to the measuring surface 8 exhibits practically no noise signals so that the first and second chronological derivation of the gap signal can also be obtained by way of differentiation of the gap signal.

Given short stator vehicles, the measuring surface 8 can be eliminated for economic reasons, and the measurement can be carried out relative to the solid reaction rail instead.

In addition, a further metal measuring surface 10 is applied to an angular measuring strip 7, the further measuring surface 10 being interrupted in the propagation direction of the ampere bar wave, whereby the interruptions are applied in a fixed assignment relative to the elongate stator winding 2 and therefore form the information carrier for the vehicle position and the sub-values derived therefrom.

The information digitally stored on the measuring surface 10 is acquired with a sensor system 11 comprising a transmitter coil 12 and a receiver coil 13. The sensor system 11 is rigidly connected to the magnetic core 4 of the excitation system 3 or to the vehicle frame whereby its position relative to the maximum of the first harmonic oscillation of the exciting wave is permanently prescribed.

FIG. 3 illustrates an exemplary embodiment of a measuring strip 7 comprising an electrically non-conductive material on which an electrically conductive material 8 is continuously applied in the propagation direction X of the ampere bar wave, the gap information being measured relative to its surface. A further metallic coating 10 serves as a digital information carrier of the positional information.

A further examplary embodiment of the measuring strip is illustrated in FIG. 4 wherein both the positional information and the gap information are stored in digital form in the metallic coating 10.

FIG. 5 illustrates a measuring device for identifying the levitation gap. A transmitter coil 15 and a receiver coil 16 are applied to an insulating carrier material 14, whereby the return conductors of the coils are formed by a metallized surface 17 carried by the carrier 14.

Together with the receiver coil 16, the transmitter coil 15 forms a high frequency transformer whose magnetic coupling changes as a function of the distance of a metallic plate from the plane set by the transmission and reception coils.

When the transmission coil 15 is fed by an amplitude-stable and frequency-stable high frequency generator 18, a high frequency signal occurs at the output of the receiver coil 16, its amplitude changing as a function of the distance of the metallic plate from the plane set by the transmission and reception coils. In a following linear editing electronics circuit, the signal is filtered by a bandpass filter 20 to a frequency matched to the frequency of the high frequency generator 18, is amplified by an amplifier 21, and, finally, is demodulated by way of a demodulator 22. The DC voltage signal available at the output of the editing electronic circuit 19 is a non-linear function of the aforementioned spacing. The linearization of the measuring system, as well as the formation of the first and second derivation with respect to time, is advantageously digitally executed.

FIG. 6 illustrates an exemplary embodiment for the purpose set forth above. The output signal at 23 of the linear editing electronic circuit 19 is converted into a digital data word 26 in an analog/digital converter 24, the digital word 26 being applied to the input of a read only memory 27 synchronously with a clock signal generated by a clock generator 25. The data word 26 supplied by the digital/analog converter 24 therefore forms an address 26 of the read only memory 27 which stores values of linearized levitation gaps in tabular form. Therfore, the actual value of the levitation gap $S_n$ is available as a digital data word at the output of the read only memory 27 at each point in time $t_n$ where $n=1, 2 \ldots \infty$, prescribed by the clock 25.

For the formation of the first derivation of the levitation gap with respect to time, respectively two chronologically excessive levitation gap measured values $S_n = S(t_n)$ and $S_{n-1} = S(t_n - 1)$ are deposited in an intermediate memory 28 and are subtracted from one another at a time $t_n$ in a subtractor 29. The data word $S_n - S_{n-1}$ forms the address 30 for a following read only memory 31 in which the values $(S_n - S_{n-1})/(t_n - t_{n-1})$ are stored. When the value of the time difference $t_n - t_{n-1}$ is selected sufficiently small by way of selecting the frequency of the clock 25, then the desired value of the first derivation of the levitation gap $\dot{S}_n$ after the time $S_n$ is available as a digital word at the output of the read only memory 31 at the time $t_n$.

The second derivation $\ddot{S}_n$ with respect to time of the levitation gap $S_n$ is formed by way of an intermediate memory 32, a subtractor 33 and a read only memory 35.

Figure 7:
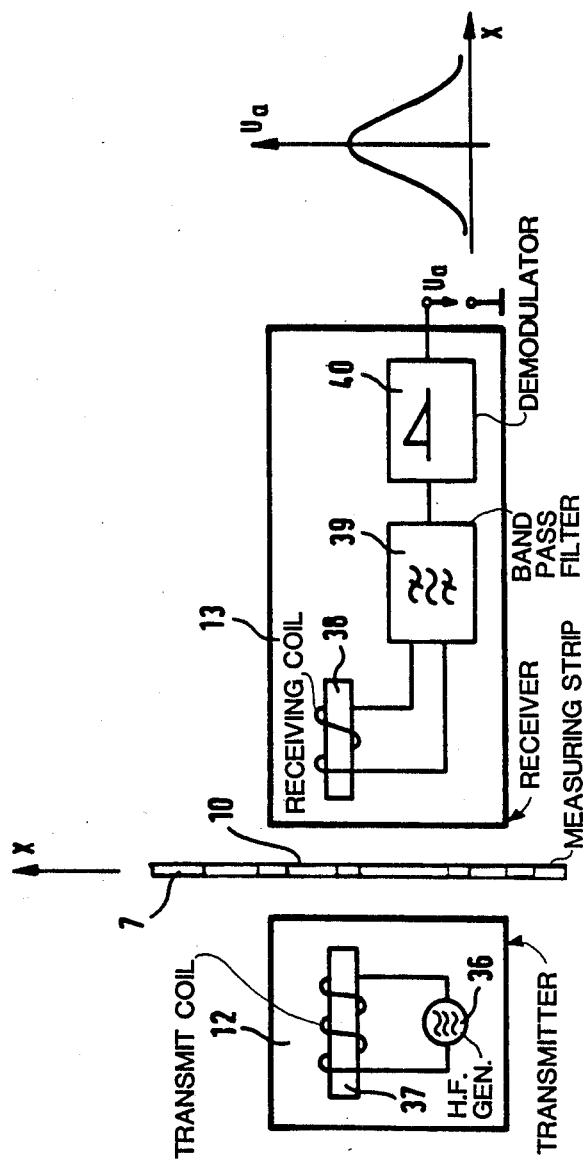
FIG. 7 is a schematic illustration of a measuring installation for pole position decoding.

FIG. 7 illustrates an exemplary embodiment of a sensor system based on an inductive measuring technique, the sensor system also being in a condition to reliably detect the slots of a measuring strip 7 which is provided between the metallic coating 10 even under difficult environmental conditions. The measuring strip 7 is introduced between the transmission system 12 and the receiving system 13. By way of a transmission coil 37 fed by a high-frequency generator 36, the transmission system 12 generates a magnetic high-frequency field which is detected by the receiving device 13 comprising a receiving coil 38, a band pass filter 39 matched to the transmission frequency and a demodulator 40. When a metallic plate is located perpendicular to the connecting axis of the transmitting and receiving coils, the magnetic field of the transmission coil 37 is shielded from the receiving coil 38, the output voltage $U_a$ of the receiving device consequently assumes a very small value. When a non-conductive interstice edged with two metal plates is located, however, perpendicular to the connecting axis of the transmission and receiving coils, the output voltage $U_a$ of the receiving device 13 becomes a maximum. This maximum, therefore, indicates the center of an interstice edged by two metal plates having sufficient accuracy. It can be advantageous for increasing this precision to employ a plurality of transmission systems and/or receiving systems for obtaining the aforementioned maximum.

Figure 8:
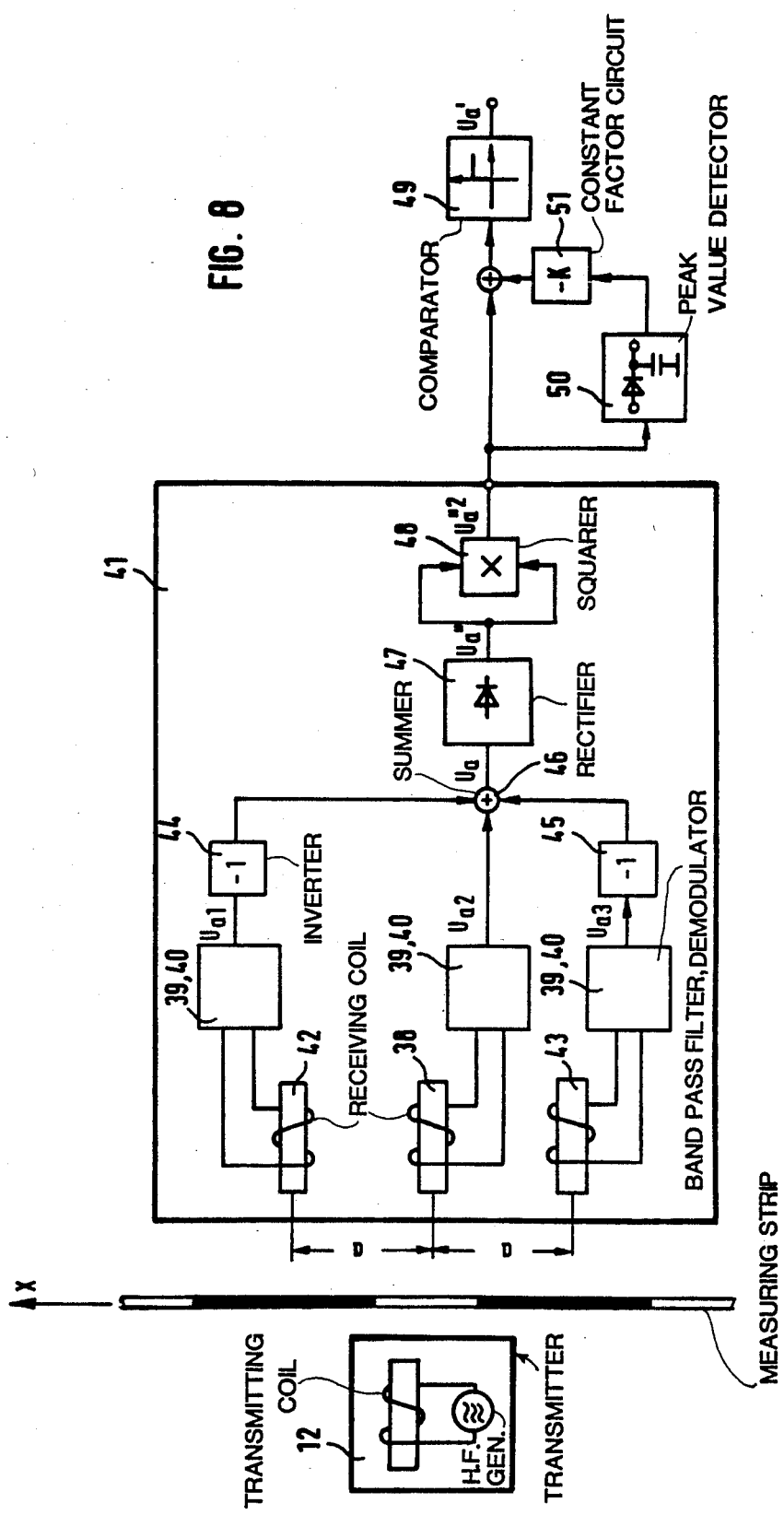
FIG. 8 is a schematic representation of a circuit arrangement according to FIG. 7.

FIG. 8 illustrates an exemplary embodiment having a transmission system 12 and an expanded receiving system 41 wherein a receiving coil 38 is connected to a band pass filter 39 and a demodulator 40 and which has been expanded by two further receiving coils 42 and 43 offset by a spacing a therebetween and having respective following band pass filters 39 and demodulators 40. The output signal of the receiving coil 38, together with the negatively-evaluated output signals 44, 45 inverted of the receiving coils 42 and 43, is supplied to a summation point 46 which is connected to a following rectifier 47 and a squarer 48. The output signal of the squarer 48 exhibits the desired, sharper information of the maximum. It is further advantageous in order to obtain a digital signal from the output voltage at the squarer 48 to supply the voltage to a comparator 49 whereby its reference value is formed from the chronologically-preceding maximum.

To this end, the preceding maximum is detected with a peak value meter 50 and is evaluated with a constant factor device 51 ($K<1$). It is therewith guaranteed that the pulse width of the digital signal always remains unaltered given a variable amplitude of the maximum.

Figure 9A:
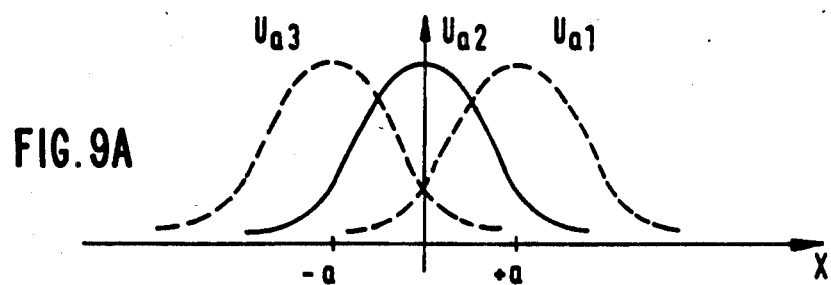
FIGS. 9A, 9B and 9C are graphic illustrations of characteristic signals of the measuring installation according to FIG. 8.
Figure 9B:
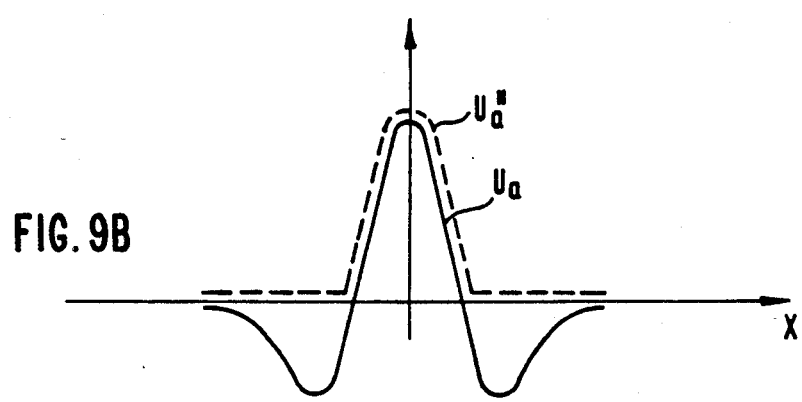
Figure 9C:
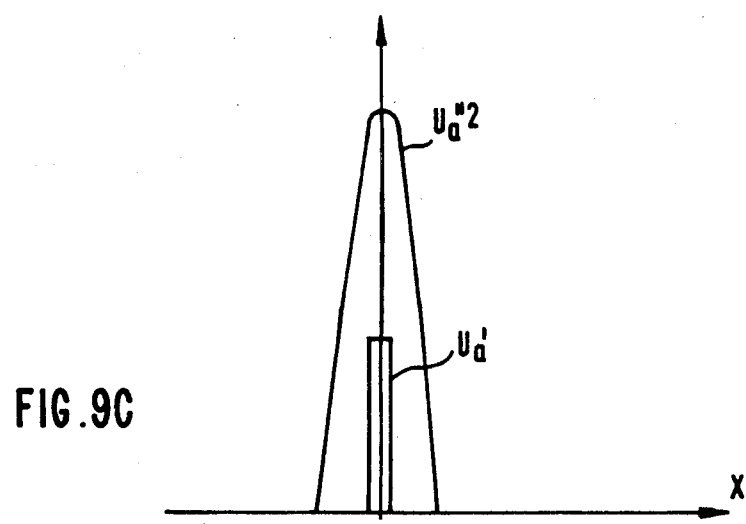

FIG. 9 illustrates, in graphical form, the characteristic signals of a device according to FIG. 8 in order to illustrate the aforementioned discussion of operation. Of course, a sensor system which comprises only transmission coils whose attenuation by the metal plates is measured can also be employed.

The digital information stored on the measuring strip in the form of the sequence of metal layer/interstice/metal layer can be reliably detected with the sensor system of FIG. 7 or FIG. 8. In order to increase the resolution of the positional information, a plurality of sensors can additionally be typically offset in the propagation direction of the ampere bar wave such that the same form a vernier. In order to avoid errors which could derive from longitudinal displacements of the vehicle sections, it is advantageous to dispose a plurality of sensor groups symmetrically relative to the center line of the vehicle.

All of the positional information required for an elongate stator magnetic levitation vehicle can be written in the measuring strip and detected on the vehicle with the above techniques. The transmission of the positional information to the substation then occurs, for example, via radio whereby one can have recourse to the slit wave guide as the transmission channel, this usually already being present. However, the positional information detected by the sensors indeed exists only in the form of digital pulses which must be suitably converted either in the substation or, on the other hand, in the vehicle itself.

Figure 10:
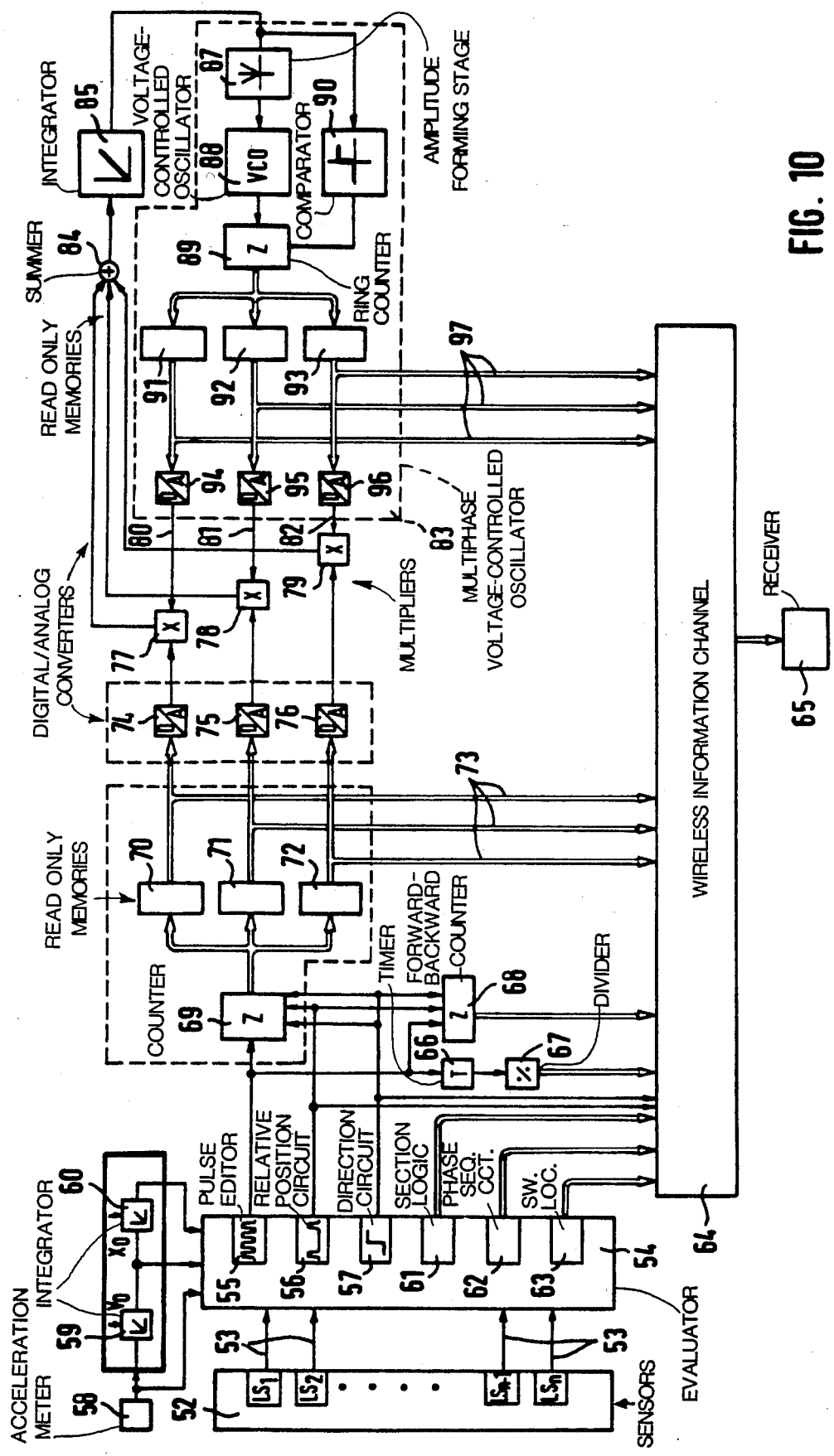
FIG. 10 is a schematic representation of apparatus for the formation of the values on the vehicle itself derived from the vehicle position information and their transmission to the substructure.

FIG. 10 illustrates an exemplary embodiment for the formation of the values derived from the vehicle position information on the vehicle itself and their transmission to the substation. The output signals 53 of the individual sensors 52 combined in group and distributed along the vehicle are edited in an evaluator 54. To this end, the output signals are converted into an equidistant pulse sequence in a pulse editing stage 55. The relative position electronics 56 emits so-called zero pulses related to the phase R of the elongate stator winding and a direction of travel electronics 57 recognizes the direction of travel of the vehicle from the chronological sequence of the output signals 53 of at least two neighboring sensors. In order to increase the resolution of the positional information, the output signals of the electronic components 55, 56 and 57 can also be assisted by measuring the vehicle acceleration on the basis of an acceleration meter 58 and by the vehicle velocity formed therefrom by an integrator 59, as well as by a path distance formed by a further integrator 60.

Pattern recognition logic elements for the location of a switch section 61, for the location and position of switches 62 and for the phase sequence of the elongate stator winding 63 recognize the information written in the measuring strip and detected by the sensors 52 and forward the same to the receiver 65 at a substation over a wireless information channel 64.

The digital output signal of the direction of travel electronics 57 and the zero pulses emitted by the relative position electronics 56 (the latter specifying the position of the phase R of the elongate stator winding relative to the excitation system) are likewise directly retransmitted to a receiver 65 at the substation over the information channel 64. In order to form the momentary vehicle velocity, the time interval between two successive pulses, supplied by the pulse editing stage 55, are measured by way of a horological device or timer 66. A division carried out in a following divider 67 leads to the desired, momentary vehicle velocity given a known division of the measuring strip.

The editing of the path information occurs in a pulse counter 68 which counts forwards or backwards depending on the output signal of the direction of travel electronics 57. The absolute path information is available as digital information as a multiple of the pole division of the elongate stator winding (via counting the output pulses of the relative position electronics 56) with the fine subdivision obtained from the output pulses of the pulse editing electronics 55.

The above discussions have shown that the vehicle position and the values to be derived therefrom can be identified on the vehicle itself and be transmitted over the wireless information channel 64 to the receiver 65 at the substation. However, it is frequently expedient not to offer the information Direction of travel,
Relative position of the phase R,
Vehicle velocity, and
Absolute path distance, directly but, rather, implicitly as trigonometric functions at the output of the receiver 65 at the substation. A 20 system suffices for this purpose, but a symmetric 30 system is to be preferred for reasons of redundancy. In order to generate the symmetrical 30 system, the output pulses of the pulse editing stage 55 are counted by a counter 69, whereby the output pulses of the relative position electronics 56 respectively set the counter to the counter reading zero and the counter counts forwards or backwards depending on the output signal of the direction of travel electronics 57. The sine functions phase-offset by respectively $2\pi/3$ are stored in tabular form in the following read only memories 70, 71 and 72 so that the desired 30 current system 73 is available in digital form at its output. Thereby, a period from the beginning of the zero pulse up to the respectively next zero pulse of the relative position electronics is covered.

Since high-frequency disruptions cannot be excluded given the difficult environmental conditions of a magnetic levitation vehicle, it is advantageous to filter the analog equivalent of the symmetrical 30 current system 73 with a low-pass filter. Passive low-pass filters are not suitable in this application due to the frequency-dependent phase shift.

The desired low-pass behavior can be obtained, however, over a control circuit, whereby a new, symmetrical and low-pass filtered 30 system arises which exhibits a constant frequency-independent phase of $\pi/2$ in comparison to the original 30 current system 73.

To this end, the digital output values of the original 30 current system 73 are converted into an analog system over digital/analog converters 74, 75 and 76. The symmetrical 30 voltage available at the outputs of the digital/analog converters 74, 75 and 76 is multiplied with three multipliers 77, 78 and 79 by the output voltages 80, 81 and 82 of a voltage-controlled 30 oscillator 83. The products of the multiplied output voltages are summed up in a summation element 84 and are supplied to an integrator 85. The output voltage of the integrator 85 adjusts the voltage-controlled oscillator 83 in terms of frequency and phase relationship such that, in its steady-state condition, its output voltages 80, 81 and 82 exhibit the same frequency as well as a constant, frequency-independent phase shift of $\pi/2$ relative to that of the original 30 current system (at the outputs of the digital/analog converters 74, 75 and 76.

The 30, voltage-controlled oscillator 83 whose output voltages 80, 81 and 82 can be varied in frequency depending on the input voltage 86 is constructed as follows:

An amplitude forming stage 87 is followed by a voltage-controlled oscillator 88 whose output frequency linearly depends on its input voltage. The output pulse sequence of the voltage-controlled oscillator 88 is counted by a ring counter 89, whereby the counting direction is determined by the polarity of the input voltage via a comparator 90. The counter reading of the ring counter 89 serves as an input variable of a plurality of read only memories 91, 92 and 93 in which the sine functions phase-offset by respectively $2\pi/3$ are stored in tabular form. The desired symmetrical 30 current system is therefore present in the output of the read only memory in digital coding which is converted into analog values with the following digital/analog converters 94, 95 and 96.

The low-pass filter vehicle position signal encoded in a symmetrical 30 system 97 now resides at the outputs of the read only memories 91, 92 and 93, the vehicle position signal now exhibiting a constant frequency-independent phase shift of $\pi/2$ in comparison to the original 30 current system 73. The bandwidth of the low-pass filter having frequency-independent phase shift is determined by the integration time constant of the integrator 85.

The above explanations illustrate that the vehicle position signal and the values derived therefrom can be detected reliably and interference-free with simple electronic devices even under rough environmental conditions.

Described below is an embodiment wherein the measuring strip additionally exhibits a slot coding for the determination of the absolute vehicle position along the travel path. A modified sensor system is also included in this embodiment.

Figure 11:
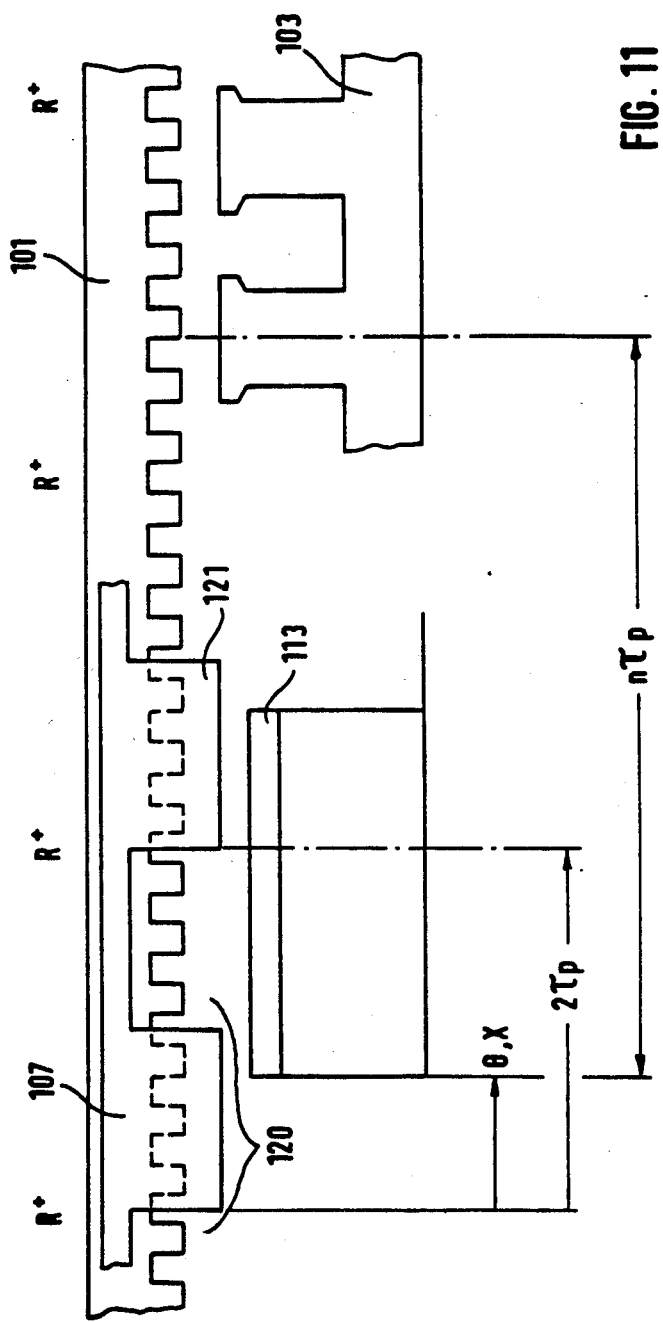
FIG. 11 is a schematic illustration corresponding to FIG. 1 of a section of a stator plate packet for a synchronous elongate stator motor having an assigned, coded measuring strip as well as, in part, a portative magnet and a sensor system for decoding.

Referring to FIG. 11, a stator plate packet 101 of the elongate stator motor having the measuring strip 107 disposed in fixed positional assignment and parallel thereto are illustrated. As a pole position decoding, the measuring strip 107 comprises recesses 120 disposed at regular intervals between which tongues 121 remain. The length of the recesses 120 or, respectively, of the tongues 121, in the longitudinal direction (X direction) respectively corresponds to one pole division $\tau_p$. Accordingly, the pole position coding is assigned to the phases of the multi-winding stator winding.

A sensor system 113, whose length in the X direction corresponds to at least twice the pole division $\tau_p$ is located on the vehicle in a spatially fixed assignment to the portative magnet 103. The spatial distance of the sensor system 113 relative to the portative magnet 103 is freely selectable because the measured signals emitted by the sensor system 113 are periodic, measured signals which, in particular, follow a sine/cosine function, wherewith a 30 dimensional angular displacement of the signals is possible.

Figure 12:
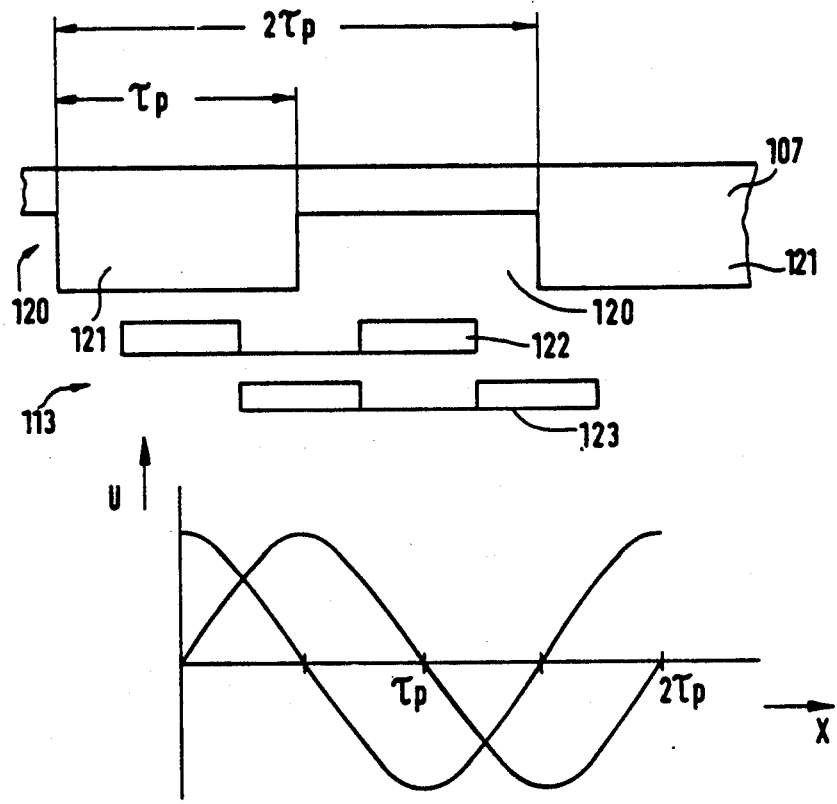
FIG. 12 illustrates a section of a measuring strip and the sensor system with further details and a diagram having the measured signals emitted by the sensors.

It is readily apparent from FIG. 12 that the sensor system which exhibits an overall length corresponding to twice the pole division comprises two sensors 122, 123 which are arranged offset by half a pole division relative to one another in the X direction. The two sensors 122, 123 exhibit differing spacing relative to the measuring strip 107.

The sensors 122, 123 are designed such that, in the train of the pole position decoding, they emit measured signals from the rectangular course of the pole position coding (recesses 120, tongues 121) which essentially contain only the fundamental wave component. Corresponding measured signals are shown in the diagram in the lower portion 12. The measured signals of two sensors 122, 123 are offset by half a pole division. Fluctuations in the interval of the sensor system 113 relative to the measuring strip 107 are expressed not only in the amplitude of the measuring signals, but in their phase relationship. Spacing influences can therefore be eliminated in a simple manner on the basis of differential information of the measured signals.

Figure 13:
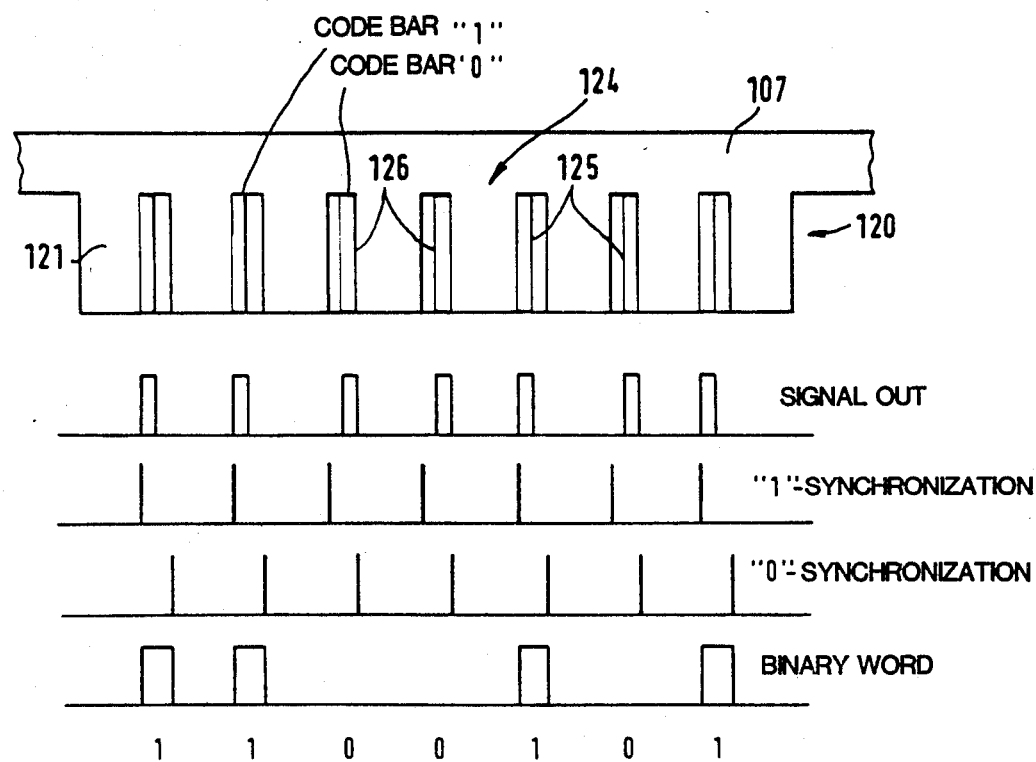
FIG. 13 illustrates a section of a measuring strip having additional slot coding and the signals obtained therefrom.

The measuring strip 107 illustrated in FIGS. 11 and 12 also exhibits a slot coding 124 which is illustrated in FIG. 13. To this end, each tongue 121 comprises a series of slots 125 which are disposed flush right or flush left relative to constant spacing grid 126. The spacing grid 126 is respectively defined by the separation between dark and light areas of the slots 125. Illustrated, in addition, in the lower portion of FIG. 13 are the respective read out signals having synchronization signals assigned thereto. Binary words which define the respective location of the vehicle along the travel path are formed from the combination of read out signals and corresponding synchronizations.

In view of low feedback of the slot coding 124 on the pole position decoding, the plurality of slots 125 disposed on each tongue 121 is thereby constant. The significance of each slot 125 is identified by its spatial position (flush right--flush left) within an area assigned to each slot. The assignment of each read slot information occurs on the basis of the pole position signal since its chronological progression orients itself by the pole position coding. Depending on the resolution of the slot information to be read, the length of the pole position coding, and the length of the information to be read, one or more pole position codings can be employed for describing a binary word.

Figure 14:
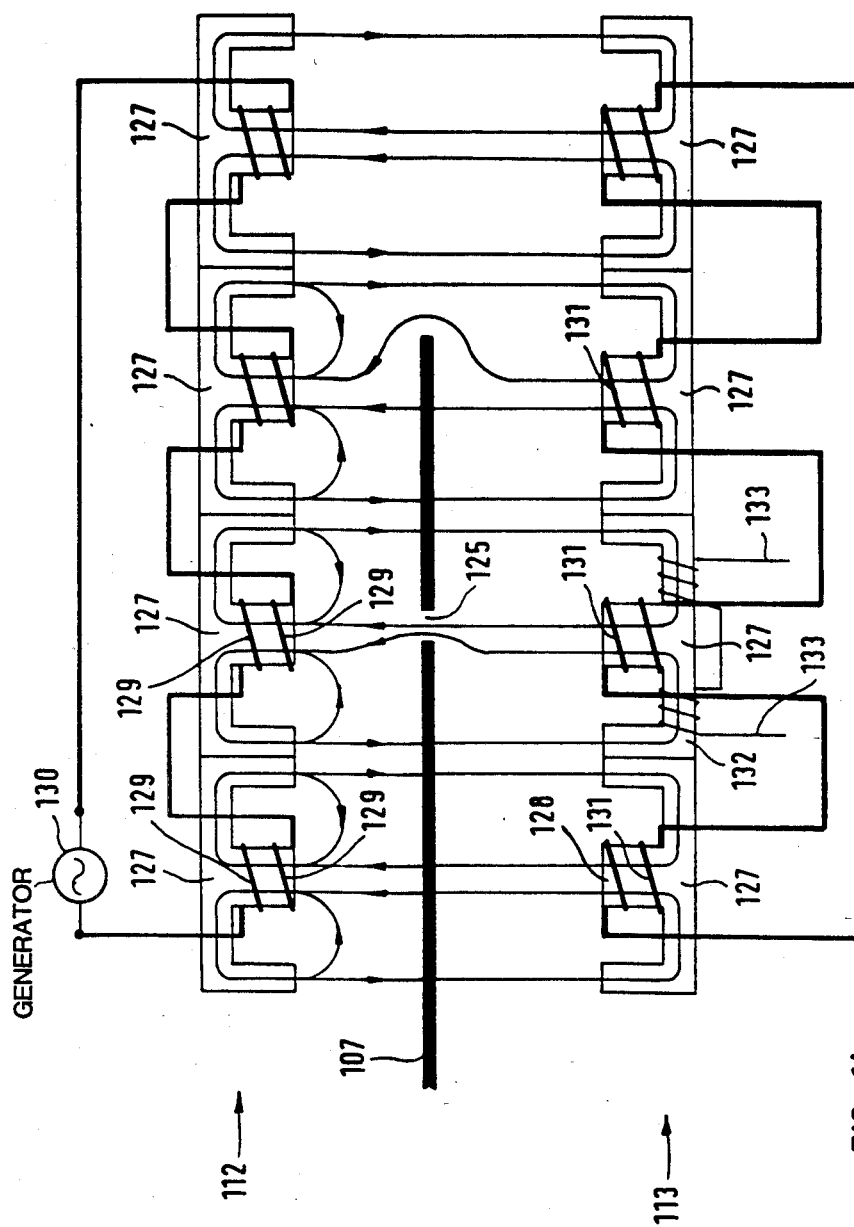
FIG. 14 is a schematic illustration of a horizontal section through a measuring strip and an assigned sensor.

FIG. 14 schematically illustrates the structure of a sensor 122 or 123 of the sensor system 112, 113. Each sensor 122 or, respectively, 123 comprises a row of U-shaped or E-shaped cores 127. Respectively each row of cores 127 is disposed at each side of the measuring strip 107. The upper row of cores 127 in FIG. 14 serves to establish a magnetic field indicated in FIG. 14. To this end, each second leg 128 of the row of cores carries a winding 129. The windings 129 are interconnected in series and are connected to a generator 130.

The lower row of cores 127 in FIG. 14 again carries a measuring winding 131 at each second leg 128. These measuring windings 131 are interconnected in series; they serve the purpose of pole position decoding.

At least two neighboring pole sections 132 of the lower core row in FIG. 14 likewise carries series-connected windings 133 which serve as a measuring winding for the slot decoding.

The alternating magnetic field generated by the exciting windings 129 on the one side of the measuring strip 107 is detected on the other side of the measuring strip 107 by the windings 131 for the pole position decoding and the windings 133 for the slot decoding. The desired information are identified by way of modulation of the magnetic flux distribution, this being indicated in FIG. 14. The eddy current effects occurring in the electrically-conductive pole position coding of the measuring strip 107 are thereby exploited. Whereas the pole position information is integrally determined over the range of approximately one pole position, the slot decoding occurs in a narrowly-limited range on the basis of the additional winding 133 which detects and exploits the field imbalances occurring when a slot 125 passes.

In order to keep the influence of the slot decoding on the pole position decoding slight, the plurality of slots 125 on each tongue 121 is constant and the slots 125 are essentially disposed at the same locations on the tongues 121, namely respectively flush right or flush left relative to the boundaries of the spacing grid.

Figure 15:
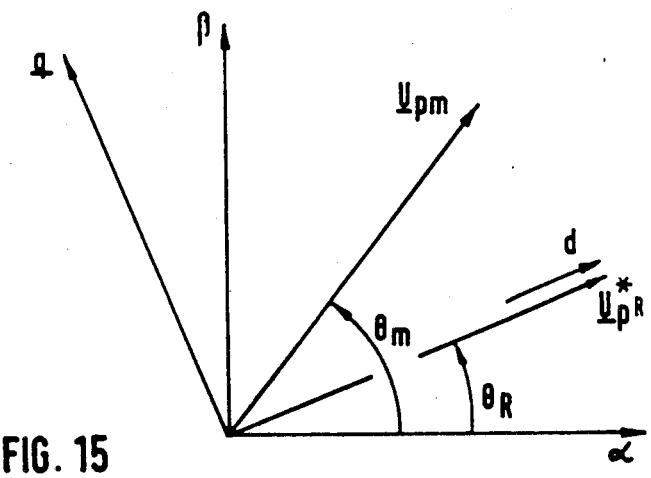
FIG. 15 is a graphic and equation representation of the pole position vector having a reference vector.

The evaluation of the measured signals for the pole position decoding advantageously occurs in that a pole position vector is first formed, its definition deriving from the equations and the graphic illustration of FIG. 15. The symbols employed are defined as follows:

$U_{pm}$ = Pole position measuring vector;
$U_{pR}$ = Reference vector;
$\theta_m$ = Pole position angle (measurement);
$\theta_R$ = Pole position angle (reference);
$\Delta\theta$ = Phase deviation;
$V_R$ = Vehicle velocity signal; and
$T_s$ = Integration time constant of the vehicle.

For eliminating the amplitude dependencey and for attenuating existing upper harmonics in the pole position signal of the sensor system 113, the measured pole position vector is multiplicatively linked with a reference vector $U_{pR}$ in accordance with the first equation of FIG. 15. This relationship corresponds to a coordinate transformation of the pole position measuring vector $U_{pm}$ to a reference coordinate system. By following up the reference vector $U_{pR}$, the stationary value is regulated to zero independently of the frequency of the pole position signal.

The imaginary portion corresponding to the angular differences $\theta_m \cdot \theta_R$ is supplied to a phase controlled loop illustrated in FIG. 16. The phase controlled loop comprises a circuit 134 for the compensation of non-linearities. Connected to the circuit 134 is a regulator 135 which supplies an analog output signal which is proportional to the vehicle velocity. The regulator 135 controls a voltage-controlled oscillator 136 at whose output a sine/cosine converter 137 is connected, the converter supplying the reference vector $U_{pR}$. The reference vector $U_{pR}$ is reduced as illustrated.

FIG. 17 illustrates a simplified, linearized phase control loop with the regulator 135 and a voltage-controlled oscillator 136. FIG. 17 illustrates the signal proportional to the vehicle velocity can be tapped at the output of the regulator 135. Since an analog signal is also available in this case for the vehicle velocity, a better dynamic behavior of the vehicle independent of the travel speed occurs in comparison to a time-discrete velocity identification. The filter effect can be set in detail over the selection of the regulator parameters.

What holds true in very general terms is that the pole position signals in the closed phase control loop are filtered frequency-independent so that it is always only the fundamental wave of the pole position signals which is employed for detecting the respective vehicle position of the magnetic levitation vehicle. A high resolution of the pole position information is possible because only analog signals are processed.

The incremental slot coding is superimposed for an unambiguous determination of the absolute vehicle position. It is guaranteed by so doing that memory contents need not be accessed for determining the absolute vehicle position, but, rather, that the sought information can be unambiguously determined from the currently-read data record.

Both measures meet the goal of high availability of the position signals in that, after elimination of potential disruptions, a redetermination of the reference system oriented to the travel path is not necessary. In addition, problematical locations such as, for example, represented by the necessary expansion gaps (of the travel path), are neutralized since the pole position decoding exhibits an integral measuring characteristic and the expansion gaps themselves are disposed in an area of the measuring strip in which no incremental slot information are written.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A device for incrementally detecting the vehicle position of a magnetic levitation vehicle along a path of travel, comprising:
   a plurality of sections which are spaced along the path of travel;
   a drive system including a three-phase power supply and a stator plate packet having a slotted surface and a stator winding connected to said three-phase power supply and defining pole spacings;
   a portative magnet spaced from said slotted surface of said stator plate packet, said portative magnet electrically excitable and cooperable with said stator to provide levitation and propulsion of the vehicle;
   a first measuring strip carried by said stator plate packet and including a first metallic reference surface in a fixed position relative to said stator winding and extending in the direction of travel;
   air gap detection means coupled to said first metallic surface for detecting the levitation air gap between said portative magnet and said slotted surface of said stator plate packet, said air gap detection means comprising an inductive sensor including a transmitting coil, a receiving coil and a high frequency generator connected to said transmitting coil to produce a signal to be modulated by said metallic reference surface, a band pass filter connected to said receiving coil, an amplifier connected to said filter, a demodulator connected to said amplifier for demodulating the received signal, an analog/digital converter connected to said demodulator for producing address words in response to the demodulated signals, read only memory means storing air gap information accessed by said addresses and operable to output air gap spacing information, and means operable in response to successive addresses to read the changes in air gap spacing from the information stored in said read only memory means;
   a second measuring strip carried by said stator plate packet and extending in the direction of travel and including a second reference surface comprising digital coding in the direction of propagation of an ampere bar wave generated by said stator winding and having a fixed position relative to said stator winding;
   code detection means mounted with said air gap detection means and carried by said portative magnet for reading said second reference surface;
   said second reference surface carrying said code comprising a sequence of electrically-conductive and electrically-non-conductive elements on said reference surface;
   said code detection means comprising inductive sensors operable to emit position indicating signals; and
   analysis means for receiving said position indicating signals and providing information including the position of the excitation system relative to the stator winding, the direction of travel, the vehicle velocity, the vehicle location, the position of the section switches, switch location and the phase sequence of the stator winding.

2. The device of claim 1, wherein:
   said second measuring strip comprises pole position coding means and slot coding means for identifying vehicle location; and
   said code detection means constitutes a sensor system comprising first winding means for detecting said pole position coding means and second winding means for detecting said slot coding means, said first and second winding means mounted at different angles with respect to said second measuring strip.

3. The device of claim 2, wherein said sensor system comprises:
   shaped magnetic cores including legs extending towards said coded measuring strip and carrying said first winding means, and magnet sections connecting said legs and carrying said second winding means.

4. The device of claim 3, wherein:
   said first and second winding means respectively comprise a plurality of first windings and a plurality of second windings; and
   at least two of said second windings carried on adjacent magnetic sections and connected in series.

5. The device of claim 2, wherein:
   said pole position coding means comprises means defining a plurality of rectangular recesses separated by tongues and disposed within the spacing of the pole division of the stator winding.

6. The device of claim 5, wherein:
   said slot coding means comprises means defining a plurality of broad slots in said tongues.

7. The device of claim 6, wherein:
   the number of slots in each tongue is the same.

8. The device of claim 6, wherein:
   said slots are disposed flush right with respect to a constant spacing grid.

9. The device of claim 6, wherein:
   said slots are disposed flush left with respect to a constant spacing grid.

10. The device of claim 2, wherein:

said sensor system comprises:
at least two sensors offset from one another in the direction of travel.

11. The device of claim 10, wherein:
said at least two sensors are offset by half a pole division of the stator winding.

12. The device of claim 2, wherein:
said first winding means comprises a plurality of first windings; and further comprising
a phase control loop connected to said first windings and operable to form a filtered pole position vector.

13. The device of claim 12, wherein:
said phase control loop comprises a voltage regulator, a voltage-controlled oscillator connected to and controlled by said regulator, and a sine/cosine converter connected to and driven by said voltage-controlled oscillator.

14. The device of claim 1, wherein said code detection means comprises:
a transmitter including a transmitter coil and a high frequency generator connected thereto on one side of said second reference surface and producing a signal to be modulated by said surface;
a receiving coil on the opposite side of said second reference surface; and
a demodulator connected to said receiving coil for demodulating the received signal.

15. The device of claim 14, wherein:
said receiving coil is one of a plurality of receiving coils and each has a demodulator connected thereto.

16. The device of claim 15, wherein:
a plurality of groups of inductive sensor systems are provided and disposed symmetrically relative the center of the vehicle.

17. The device of claim 1, wherein said code detection means comprises:
an induction coil and a high frequency generator connected to said coil producing a signal to be attenuated by said second reference surface; and
means for detecting the attenuation.

18. The device of claim 17, and further comprising:
an electronic circuit connected to said induction coil to receive the signals therefrom, said electronic circuit comprising
a pulse editor responsive to said signals to produce an equidistant pulse sequence,
a relative phase circuit operable to produce a zero pulse at the location of a predetermined phase of the stator winding excitation,
a direction of travel circuit operable to emit a signal indicative of the direction of travel,
a timer connected to said pulse editor and operable to emit a signal between two pulses emitted by said pulse editor,
a divider connected to said timer and responsive to its pulses to produce a momentary vehicle velocity signal,
a vehicle position circuit for producing vehicle position signals, and
a forwards/backwards counter connected to said pulse editor, to said vehicle direction of travel circuit and to said vehicle position circuit for indicating vehicle location; and
pattern recognition means for locating switch sections, positions of switches and the phase relationships of the stator.

19. The device of claim 18, and further comprising:
a counter connected to said pulse editor, said position circuit and said direction circuit and operable to produce addresses;
a plurality of read only memories connected to said counter and storing information relating to a multiphase system and accessed by said addresses to provide multiphase information.

20. The device of claim 19, and further comprising:
a plurality of digital/analog converters connected to said read only memories for producing analog signals from the read information;
a multiphase voltage-controlled oscillator means producing multiphase signals;
a plurality of multipliers connected to said digital/analog converters and to said multiphase voltage-controlled oscillator means for producing multiphase output signals;
a summer connected to said multipliers for summing the output signals thereof; and
an integrator connected to said summer for producing a regulating signal for said multiphase voltage-controlled oscillator means.

21. The device of claim 20, wherein said multiphase voltage-controlled oscillator means comprises:
a single-phase voltage-controlled oscillator;
a ring counter connected to said single-phase voltage controlled oscillator for counting the output pulses thereof;
a comparator connected between said integrator and said ring counter for determining the operational sign of the integrated signal to determine the counting direction;
a magnitude forming circuit connected between said integrator and said single-phase voltage-controlled oscillator;
a plurality of further read only memories storing data representing mltiphase oscillator output signals connected to and addressed by said counter; and
a plurality of further digital/analog converters connected between said further read only memories and said multipliers.

22. The device of claim 21, wherein said multiphase voltage-controlled oscillator means is a two-phase oscillator.

23. The device of claim 21, wherein said multiphase voltage-controlled oscillator means is a three-phase oscillator.

* * * * *